United States Patent Office 3,264,004
Patented August 2, 1966

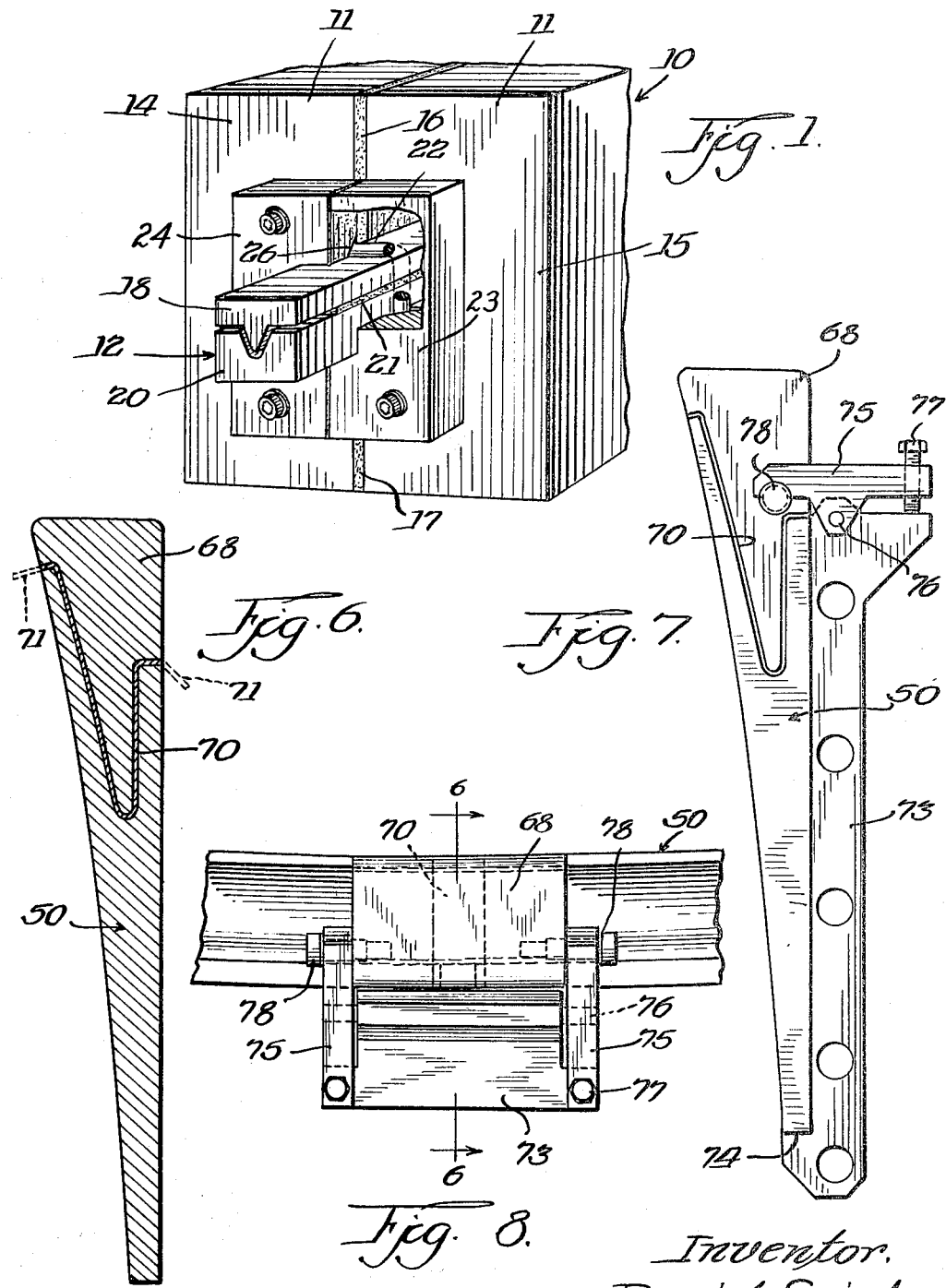

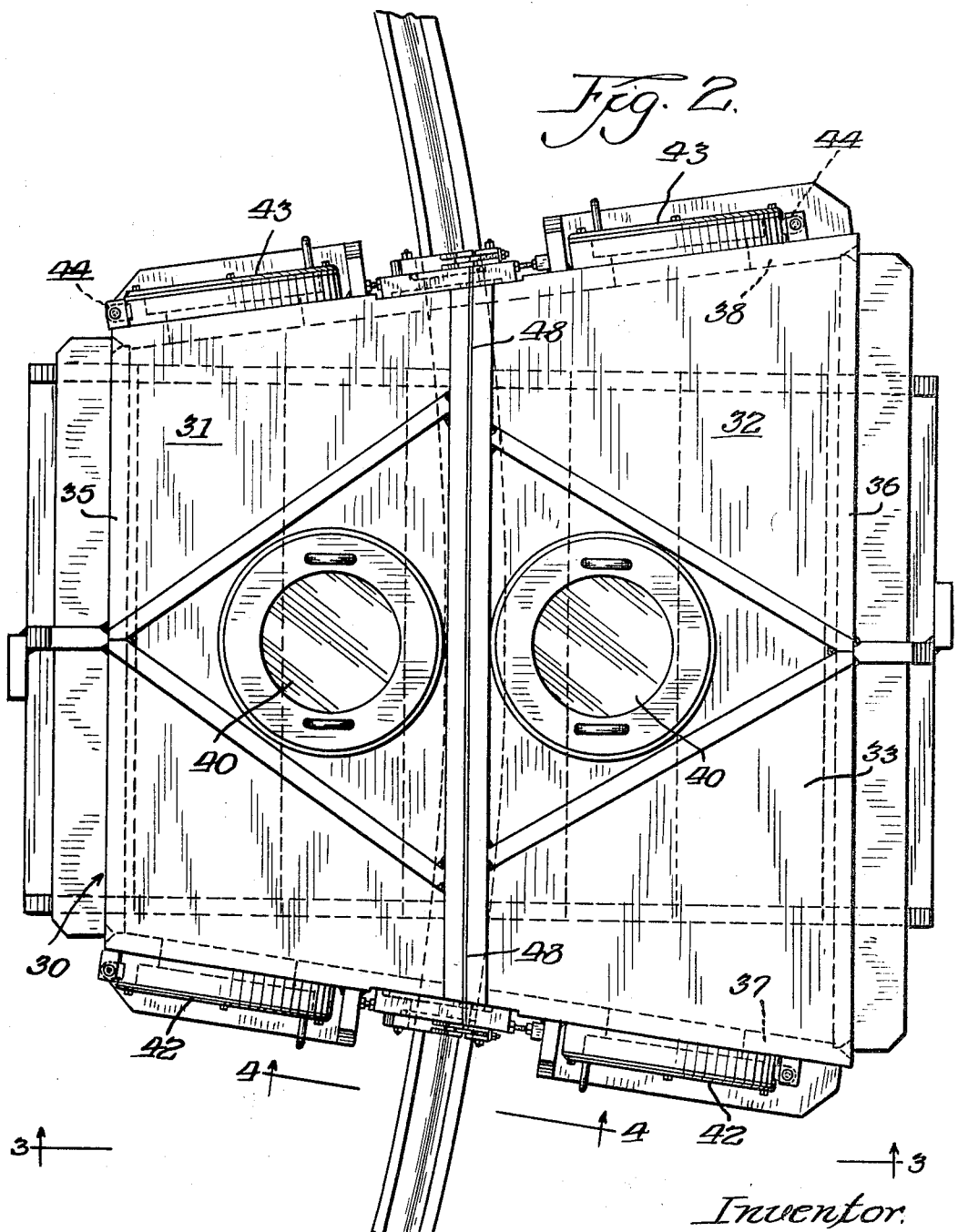

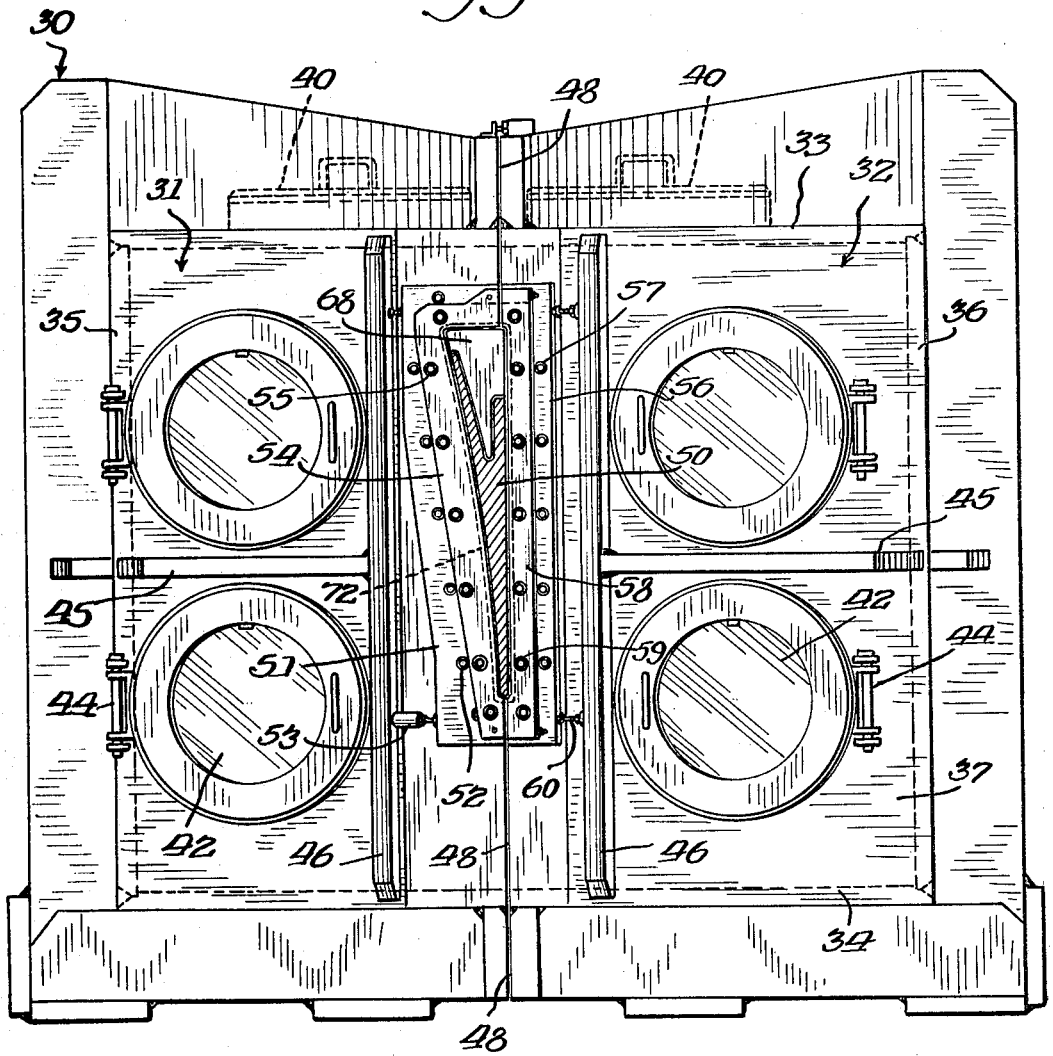

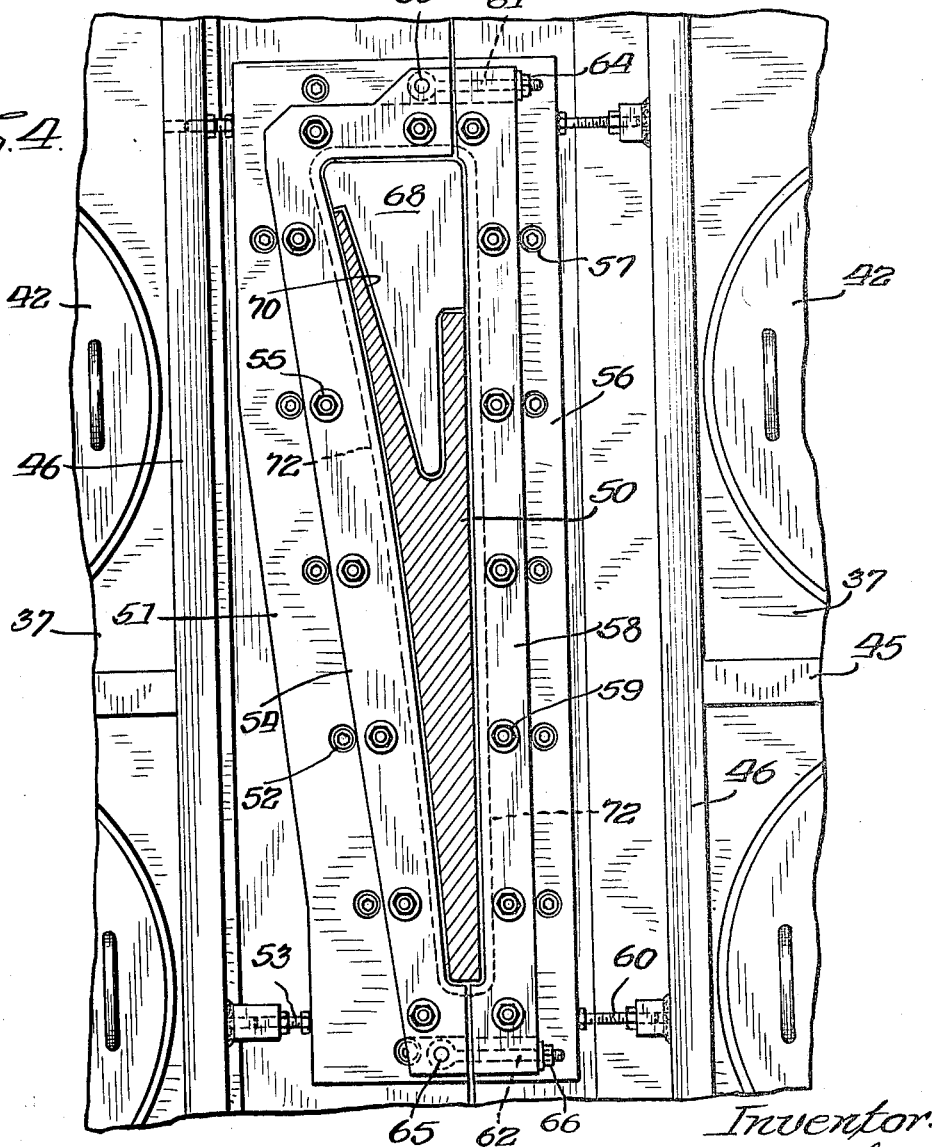

3,264,004
VACUUM CHAMBER SEALING MEANS
David Sciaky, Chicago, Ill., assignor to Welding Research, Inc., Chicago, Ill., a corporation of Illinois
Filed Feb. 25, 1964, Ser. No. 347,195
8 Claims. (Cl. 277—5)

The invention relates to enclosures such as a chamber wherein a high vacuum is caused to exist and has reference, more particularly, to improved sealing means for a vacuum chamber for sealing the same with respect to a workpiece extending through the walls on one or on both sides of the chamber.

In vacuum work it is often necessary to provide means whereby an hermetic seal is effected between an evacuated chamber and an object which is accessory to the chamber. The class of seal herein contemplated is that which may be termed semi-permanent, that is, where the sealing effect is accomplished by compression and flow of an elastic sealing member rather than the class known as permanent, where the object and the chamber are combined by welding, brazing or by similar means.

The object which is accessory to the chamber may be both interior and exterior of the chamber by reason of passing through one wall thereof or the object may be a part of the vacuum chamber or a portion of the workpiece on which an operation is to be performed in the vacuum environment. Further, the object may be a mechanism or other apparatus such as might be useful to the accomplishment of the work to be performed in the vacuum chamber.

The semi-permanent sealing of objects as contemplated by the invention is effectively solved by employing elastic sealing members customarily known as O-rings. However, the success of O-ring seals is limited to those cases where the ring is required to seal in a single direction only, either axially or radially. Such elastic sealing members are not considered capable of sealing in two directions simultaneously with any great degree of success. Also, as regards the foregoing it is necessary that the object and the opening in the chamber wall have surfaces which lie in a common plane, the surfaces being coplanar in the case of axial sealing and concentric in the case of radial sealing. Thus the techniques of the present invention, although not limited thereto, nevertheless have special application to objects accessory to the chamber and which may be one or a combination of the following:

A. An object of a size such that its length is greater than any dimension of the vacuum chamber, with its other two dimensions being smaller than the vacuum chamber so that in effect the vacuum chamber locally surrounds the object at one point along its length.

B. An object of the type described in A, additionally consisting of two parts at the point where the parts of the object enter and exit the vacuum chamber.

C. Objects of the type described in A or B and, in addition, where the configuration is that of a closed loop after the work to be performed within the chamber has been accomplished.

In view of the foregoing the invention has for an object to provide a vacuum chamber having two coacting sections and which will hermetically seal a workpiece when the sections are brought together and caused to contact the workpiece and to contact each other, the workpiece entering the chamber by passing through one side wall and exiting from the chamber by passing through the opposite side wall.

The invention is more particularly concerned with a vacuum chamber which is split vertically to form two component sections with the sections being disposed on respective sides of the workpiece and wherein mechanical means are located on each section for effecting an hermetic seal by means of an O-ring having surrounding relation with the workpiece.

Another and more specific object of the invention resides in the provision of sealing means as herein described for workpieces of irregular contour and which contemplates the employment of a block or the like releasably held to the workpiece for filling out any depression or cavity in the workpiece. Accordingly, the exterior contour of the workpiece in the area adapted to have contact with the walls of the chamber is rendered approximately circular or rectangular for accommodating the O-ring in the most efficient manner to achieve the maximum sealing effect.

Another object is to provide improved sealing means designed for a vacuum chamber which is split longitudinally to form two component sections and which will effectively seal the vacuum chamber with respect to a Y-shaped workpiece, the improvement including one or more blocks for rounding out the contour of the workpiece and an O-ring for sealing the workpiece with respect to the chamber walls having contact therewith.

With these and various other objects in view, the invention may consist of certain novel features of construction and operation, as will be more fully described and particularly pointed out in the specification, drawings and claims appended thereto.

In the drawings which illustrate an embodiment of the device and wherein like reference characters are used to designate like parts—

FIGURE 1 is a perspective view showing a vacuum chamber one wall of which is pierced by a two-part object, with means being provided in accordance with the invention for effecting a seal between the object and the vacuum chamber;

FIGURE 2 is a top plan view showing a sectional vacuum chamber in enclosing relation with a workpiece of irregular contour, the said workpiece passing through opposite side walls of the chamber;

FIGURE 3 is a vertical side elevational view taken substantially along line 3—3 of FIGURE 2, the same clearly illustrating sealing means for a workpiece of irregular contour;

FIGURE 4 is a vertical side elevational view taken substantially along line 4—4 of FIGURE 1 and showing on a larger scale the improved sealing means of the invention;

FIGURE 5 is a fragmentary top plan view showing the sealing means as illustrated in FIGURE 4;

FIGURE 6 is a sectional view of the Y-shaped workpiece as illustrated in FIGURES 3, 4 and 5, the workpiece having a block inserted between the legs thereof for correcting the contour;

FIGURE 7 is an elevational view showing a form of clamp for clamping the block in place on the workpiece; and FIGURE 8 is a top plan view showing clamps as illustrated in FIGURE 7 applied to a workpiece for holding a block in place.

FIGURE 1 shows a vacuum chamber 10, one wall 11 of which is pierced by a two-part workpiece generally designated by numeral 12. Means are provided for effecting a seal between the object and the vacuum chamber. The vacuum chamber consists of two sections 14 and 15 having an intermediate elastic sealing member 16 and 17 located, respectively, above and below the workpiece. A seal between the parts 18 and 20 of the workpiece 12 is provided by the elastic member 21. The member 21 does not extend for the entire length of the workpiece but only for that portion in the immediate vicinity of the chamber wall to which the workpiece extends. An additional sealing member 22 encircles the workpiece and seals the workpiece with respect to the walls of the chamber and with respect to the elastic members 16, 17 and 21. The clamping plates 23 and 24 are respectively secured to the sections 14 and 15, and the inside surface of each clamping plate is bevelled at 26 for compressing the sealing member 22 and simultaneously applying an axial and radial force to the sealing member.

The elastic sealing member 22 is a conventional O-ring which surrounds the two-part workpiece and has a relatively tight resilient engagement therewith. Members 16 and 17 are flat rubber sheets of the required thickness, the said members have a width which is determined by the compression force available and the need to compress the elastic sealant to a thickness ranging from about 50% to 90% of its initial thickness.

FIGURES 2, 3 and 4 show a commercial form of vacuum chamber suitable for use in electron beam welding. The chamber 30 is split vertically approximately centrally of its width to form two component sections 31 and 32, each having a top wall 33, a bottom wall 34, front and rear walls 35 and 36, and side walls 37 and 38. Glass windows are provided in certain of the walls to permit the operator to visually inspect the welding operation taking place within the chamber. Thus a circular glass window 40 is located in the top wall 33 of each of the component sections 31 and 32. Also, similar glass windows 42 are provided in side walls 37 with glass windows 43 being provided in the side walls 38. As best shown in FIGURE 3 the windows 42 and 43 are pivoted at 44 to their respective side wall, and the side walls 37 and 38 are each reinforced by the metal ribs 45 and 46.

From the foregoing it will be understood that the vaccum chamber 30 can be considered as split vertically on the parting line 48 to form the two component sections 31 and 32. The structure as shown in the drawings is adapted for welding operations on a workpiece 50 of irregular contour and which in particular is in the form of a Y having legs which are unequal in length. The workpiece can be considered as entering the vacuum chamber by passing through walls 37 and as leaving the chamber by passing through walls 38. The side edges which form the parting line between the sections are in contact with an elastic strip similar in all respects to the elastic strips 16 and 17 described in connection with the sections 14 and 15 of the vacuum chamber shown in FIGURE 1. When the sections are in pressure contact, the elastic strips form an hermetic seal to assist in maintaining the vacuum conditions within the chamber. The side edges of the parting line at the location where the workpiece 50 enters and also where the workpiece leaves the chamber, are each provided with a recess which generally approximates in outline its half of the workpiece. The recess formed in wall 37 of section 31 is surrounded by an adapter 51 secured to the wall 47 by the securing screws 52. The adapter has the lateral adjusting members 53 located between the adapter and the vertical reinforcing ribs 46. A clamping plate 54 is secured to the adapter by the securing screws 55 and said plate is recessed along its coacting edge so as to provide an opening of a shape complementary to its half of the workpiece. In a similar manner the side plate 37 of section 32 has an adapter plate 56 secured thereto by the screws 57 and a clamping plate 58 is, in turn, secured to the adapter plate by the screws 59. The lateral adjusting members 60 are located between the adapter plate 56 and the vertical reinforcing rib 46.

As best shown in FIGURE 4 the clamping plates 54 and 58 are locked together at the top and at the bottom by links 61 and 62. Link 61 is pivotally secured at 63 to the clamping plate 54 and the body of the link fits within a slot in the clamping plate 58 so that its threaded end extends beyond the right hand edge of plate 58 for receiving the fastening nut 64. When the nut is tightened the top portion of the two clamping plates can be drawn together. The link 62 functions in a similar manner for drawing together the bottom portions of the clamping plates. Said link 62 has a pivoted connection at 65 with plate 54 and the body of the link has location in a slot in plate 58 to extend beyond for receiving the nut 66.

Due to the irregular shape of the workpiece 50 the same is not adaptable for sealing by means of an O-ring seal. It is not possible for this type of seal to follow the contour of the workpiece due to the interior groove formed by the two legs. The invention successfully overcomes this difficulty by employing a block such as 68 which fills the groove and gives to the workpiece an exterior outline which approximates a rectangle. Of course, the block 68 must have a sealing fit with the workpiece and this accounts for the elastic strip 70 which is disposed intermediate the parts as best shown in FIGURE 6. When initially assembling the parts, the length of the strip must be adequate to allow the ends 71 to project beyond the side walls of the workpiece. Following the location of the block within the groove, the ends are sheared or cut precisely flush with the side walls of the combination block and workpiece. This eliminates any possibility of a void or a depression existing at the joint which might develop a leak and admit atmospheric air to within the vacuum chamber.

The O-ring seal 72 surrounds the combination block and workpiece and since the two-part combination is approximately rectangular in outline, the elastic ring is under tension at all points in its periphery. This would not be the case if the O-ring were caused to follow the contour within the groove formed by the legs of the workpiece. The faces of the adapter plates 51 and 56 are recessed for receiving the O-ring as evident from FIGURE 5, and the O-ring is accordingly pressed into close and sealing contact with the combination block and workpiece. This is especially the case when the parts are assembled as shown in FIGURE 4 and when the clamping and adapter plates of the two component sections have been drawn together by the links 61 and 62. Accordingly, it will be seen that with the structure described, either one or both of the side walls of the vacuum chamber can be sealed with respect to a workpiece, even though the workpiece may have an irregular contour.

The sealing of the two component sections of the vacuum chamber along the parting line 48 does not present any problem. Also, the sealing of the block such as 68 within the groove of the workpiece can be easily taken care of. With the block in place and sealed to the workpiece, the action of the O-ring is effective in sealing the workpiece and it will be observed that an hermetic seal is produced with respect to the chamber walls, and with respect to the elastic sealing strip 70, and also with respect to the sealing strip at the parting line 48 between the two sections of the chamber.

The structure shown in FIGURES 7 and 8 relates to a form of clamp for holding the workpiece 50 and the block 68 in assembled relation. The body portion 73 of the clamp engages the extreme lower end of the workpiece at 74. The clamp 75 is pivoted to the upper end of the body portion at 76. One end of the clamp carries the adjusting screw 77, whereas the opposite end of the clamp is adapted to engage the pin 78 fixed to and extending outwardly of the block 68. FIGURE 8 shows in top plan the spaced relation of a pair of such clamps for holding a block such as 68 to a workpiece under the necessary pressure required for a sealing fit. When the block and workpiece combination is applied to a vacuum chamber having the sealing structure as described, one clamp will be located within the chamber with the other clamp having location outside the chamber. The parting line 48 between the sections of the chamber will be in substantial alignment with the longitudinal center of the sealing strip 70.

The invention is not to be limited to or by details of construction of the particular embodiment thereof illustrated by the drawings, as various other forms of the device will, of course, be apparent to those skilled in the art without departing from the spirit of the invention or the scope of the claims.

What is claimed is:

1. In sealing structure of the character described, the combination with a supporting wall consisting of two component sections, of a two-part object extending through an opening in the wall, said opening being located in substantial alignment with the parting line between the sections, elastic sealing material interposed between the sections on the parting line, an elastic sealing member between the parts of the object, an O-ring seal having encircling relation with the two-part object, and a plate member secured to each component section of the wall and disposed adjacent respective sides of the object, said plate members having coacting relation with each other and with the O-ring whereby to compress the O-ring and simultaneously apply a radial and axial pressure to the same.

2. In sealing structure of the character described, the combination with a supporting wall consisting of two component sections, of a two-part object extending through an opening in the wall and being disposed normal to the wall, the parts of said object extending longitudinally, and an elastic sealing member located between the said longitudinally extending parts, the said opening being located in substantial alignment with the parting line between the sections, elastic sealing material interposed between the sections on the parting line, an O-ring seal having encircling relation with the two-part object, and a plate member secured to each component section of the wall and disposed adjacent respective sides of the object, said plate members coacting with each other and with the O-ring whereby to compress said O-ring and simultaneously apply a radial and axial pressure to the same.

3. Sealing structure of the character as described in claim 2 wherein said opening is formed by a recess in each of the component sections on the adjacent edges thereof, and wherein each plate member is secured to its component section in the vicinity of the recess formed in said section.

4. In sealing structure of the character described, the combination with a vacuum chamber consisting of two half sections capable of separating on the parting line between sections, of a two-part object extending through an opening in at least one wall of the chamber so that part of the object is exterior and part interior of the chamber, the parts of said object being disposed longitudinally and an elastic sealing member having location between the longitudinal parts of the object, the opening in said wall of the chamber being located in substantial alignment with the said parting line, elastic sealing material interposed between the sections on the parting line, an O-ring seal having encircling relation with the two-part object and a plate member secured to each section of said wall and disposed adjacent respective sides of the object, said plate members coacting with each other and with the O-ring seal whereby to compress the O-ring and simultaneously apply a radial and axial pressure to the same.

5. Sealing structure of the character as described in claim 4 wherein the two-part object extends through the opening in said wall so as to be disposed substantially normal thereto, and wherein each plate member is secured to its section adjacent that part of the opening formed in the section.

6. In sealing structure for a vacuum chamber consisting of two half sections capable of separating on the parting line between sections, a two-part workpiece adapted to extend through an opening in one wall of the chamber so that part of the workpiece is exterior and part is interior of the chamber, the parts of said workpiece being disposed longitudinally and an elastic sealing member located between the said longitudinal parts, the said opening in the wall being formed by a recess in each section of the wall on the adjacent edges forming the parting line, elastic sealing material interposed between the sections on the parting line, an O-ring seal having encircling relation with the two part workpiece, and a plate member fixed to each section of the said wall in the vicinity of the recess in said wall, said plate members coacting with each other and with the O-ring seal whereby to compress the O-ring and simultaneously apply a radial and axial pressure to the same.

7. Sealing structure for a vacuum chamber as defined by claim 6, wherein one part of the workpiece is irregular in contour, and wherein the other part comprises a block having interfitting relation with the irregular part so as to round out the contour of the complete workpiece.

8. Sealing structure for a vacuum chamber as defined by claim 6, wherein one part of the workpiece is irregular in contour having the shape in cross-section of a Y, and wherein the other part comprises a block having interfitting relation between the legs of the Y so as to round out the contour of the complete workpiece.

References Cited by the Examiner

UNITED STATES PATENTS

| | | | |
|---|---|---|---|
| 807,751 | 12/1905 | Levermont et al. | 277—66 X |
| 2,851,290 | 9/1958 | Hanson | 277—66 X |
| 3,076,655 | 2/1963 | Washburn | 277—66 X |

SAMUEL ROTHBERG, *Primary Examiner.*